United States Patent
Qiu

(10) Patent No.: US 11,376,532 B2
(45) Date of Patent: Jul. 5, 2022

(54) FLUID FLOW CONTROL DEVICE HAVING A PARTICLE CATCHER

(71) Applicant: FISHER CONTROLS INTERNATIONAL LLC, Marshalltown, IA (US)

(72) Inventor: Yan Qiu, Marshalltown, IA (US)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 0 days.

(21) Appl. No.: 16/136,806

(22) Filed: Sep. 20, 2018

(65) Prior Publication Data

US 2019/0099703 A1 Apr. 4, 2019

Related U.S. Application Data

(60) Provisional application No. 62/565,787, filed on Sep. 29, 2017.

(51) Int. Cl.
*B01D 35/28* (2006.01)
*F16K 1/42* (2006.01)
(Continued)

(52) U.S. Cl.
CPC ............. *B01D 35/28* (2013.01); *B01D 35/02* (2013.01); *F16K 1/42* (2013.01); *F16K 3/267* (2013.01);
(Continued)

(58) Field of Classification Search
CPC .................... B01D 35/28; B01D 35/02; B01D 2201/167; B01D 35/157; B01D 35/1573;
(Continued)

(56) References Cited

U.S. PATENT DOCUMENTS

| 3,665,964 A | 5/1972 | Brown et al. |
| 3,700,209 A * | 10/1972 | Usry ..................... F16K 39/022 |
| | | 251/282 |
| 4,004,613 A | 1/1977 | Purton et al. |
| 2002/0083841 A1* | 7/2002 | Chaouachi ......... A47J 27/21183 |
| | | 99/279 |

(Continued)

FOREIGN PATENT DOCUMENTS

CN 205896234 U 1/2017

OTHER PUBLICATIONS

International Search Report and Written Opinion, corresponding International Application No. PCT/US2018/051403, dated Dec. 6, 2018.

(Continued)

*Primary Examiner* — Madeline Gonzalez
(74) *Attorney, Agent, or Firm* — Marshall, Gerstein & Borun LLP

(57) ABSTRACT

A fluid flow control device includes a valve body defining an inlet, an outlet, and a fluid flow path extending therebetween, a valve seat ring coupled to the body that defines an orifice through which the fluid flow path passes, a cage coupled to the body that defines an interior bore, a control element slidably disposed within the interior bore of the cage, and a particle catcher at least partially disposed within an interior bore of the control element. The particle catcher includes a particle catcher body that defines an inner flow path and at least one particle catcher passage through which the fluid flow path passes. An outer surface of the particle catcher and an inner surface of the control element form a particle catching portion. The at least one particle catcher passage directs the fluid flow path downwardly into the particle catching portion.

9 Claims, 6 Drawing Sheets

(51) Int. Cl.
*B01D 35/02* (2006.01)
*F16K 3/26* (2006.01)
*F16K 47/04* (2006.01)
*F16K 25/04* (2006.01)
*F16K 3/314* (2006.01)
*F16K 47/08* (2006.01)

(52) U.S. Cl.
CPC .............. *F16K 3/314* (2013.01); *F16K 25/04* (2013.01); *F16K 47/04* (2013.01); *F16K 47/08* (2013.01); *B01D 2201/167* (2013.01)

(58) Field of Classification Search
CPC ......... B01D 17/12; B01D 21/30; F16K 3/267; F16K 47/04; F16K 25/04; F16K 3/314; F16K 47/08; F16K 1/42; F16K 1/32; F16K 1/36; F16K 27/02; F16K 5/0605; F16K 5/12; F16K 47/045; F16L 55/02736

USPC ................. 210/429, 97; 137/625.32; 138/42; 251/282

See application file for complete search history.

(56) References Cited

U.S. PATENT DOCUMENTS

| | | |
|---|---|---|
| 2012/0216495 A1 | 8/2012 | McAuliffe et al. |
| 2016/0123477 A1* | 5/2016 | Eilers ........................ F16K 1/34 |
| | | 137/601.18 |
| 2016/0206982 A1* | 7/2016 | Richter ................... B01D 35/02 |
| 2016/0223099 A1* | 8/2016 | Freitas .................... F16K 47/08 |

OTHER PUBLICATIONS

European Office Action, corresponding European Patent Application No. 18793288.4, dated Mar. 18, 2021.

* cited by examiner

FLUID FLOW CONTROL DEVICE HAVING A PARTICLE CATCHER

CROSS-REFERENCE TO RELATED APPLICATION

Priority is claimed to U.S. Provisional Patent Application No. 62/565,787, filed Sep. 29, 2017, the entire contents of which are incorporated herein by reference.

FIELD OF THE DISCLOSURE

The present disclosure generally relates to fluid flow control devices and, more particularly, to a particle catcher that retains particles flowing along a fluid flow path.

BACKGROUND

Valves are commonly used in process control systems to control the flow of process fluids. Sliding stem valves (e.g., a gate valve, a globe valve, a diaphragm valve, a pinch valve, etc.) typically have a closure member (e.g., a valve plug) disposed in a fluid path. A valve stem operatively couples the closure member to an actuator to move the closure member between an open position and a closed position to allow or restrict fluid flow between an inlet and an outlet of the valve. The valve may use a cage-style trim in which a cage surrounds the closure member and the stem to provide for guiding movement of the closure member. The cage may include any number of openings through which the fluid flow path passes.

In existing systems, and as illustrated in FIGS. 1 and 2, some known valves 10 include a valve body 12 forming a channel 14 defining a fluid flow path that extends from an inlet 16 of the valve body 12 to an outlet 18 of the valve body 12 via a gallery 20 disposed between the inlet 16 and the outlet 18. The valve body 12 further defines an opening 22 disposed in communication with the gallery 20. A valve seat 24 is at least partially formed by the valve body 12 and is disposed in the gallery 20.

A valve bonnet 26 at least partially covers the opening 22 of the valve body 12. A valve stem 28 has a first portion 28a and a second portion 28b, and is at least partially disposed within the opening 22. A flow control element 30 in the form of a plug is coupled to the first portion 28a of the valve stem 28. The plug 30 is adapted to be moved into and out of sealing contact with the valve seat 24. The plug 30 may include a balance port 30a for equalizing fluid pressure acting on opposite sides of the plug 30. A cage 32 surrounds the plug 30 and assists in guiding movement of the plug 30. It is understood that the valve 10 includes any number of additional components to assist in operation such as, for example, a retainer, a flange, a valve stem spring, any number of gaskets, seat rings, washers, and/or packing rings.

In some environments, particles may be interspersed within the fluid flowing through the fluid path. For example, in some valves, magnetite (i.e., iron-oxide) can build up within components disposed in the bonnet area 26 of the valve. In these applications, the magnetite particles, floating in the fluid stream, can work themselves through components of the valve 10 such as the valve plug 30 and the cage 32, and gradually collect between the components. The buildup of magnetite can cause the valve plug 30 to stick, which in turn can eventually prevent the valve from opening. Typically, this buildup occurs rapidly in these applications, and requires frequent intervention to clean the plug and other valve internals.

Magnetite buildup can be alleviated using a number of approaches. For example, the guiding tolerances between components can be modified, which can create a larger gap between components. In other examples, a plug catcher (or strainer) 34 can be installed to operate with existing plugs. The plug catcher 34 is provided in the form a three-piece component including a drilled tube 36 and two disks 38, 40 coupled to opposing ends of the tube 36. When disposed in the fluid flow path, the plug catcher 34 has two approximately 90° turns (at points A and B in FIG. 1) to filter the magnetite from the fluid flow. Specifically, fluid flows from a bottom portion 34a of the plug catcher, through the holes 36a of the drilled tube 36, and upwards through the balance port 30a (at point C in FIG. 1).

Because the plug catcher 34 is constructed from three pieces, it often requires substantial time and resources to machine and assemble. Further, the plug catcher 34 may not adequately restrict magnetite particles from flowing along the flow path in environments with high flow rates.

SUMMARY

In accordance with one exemplary aspect, a fluid flow control device includes a valve body defining an inlet, an outlet, and a fluid flow path extending therebetween, a valve seat ring coupled to the body that defines an orifice through which the fluid flow path passes, a cage coupled to the body that defines an interior bore, a control element slidably disposed within the interior bore of the cage, and a particle catcher at least partially disposed within an interior bore of the control element. The particle catcher may be constructed from one piece, and includes a particle catcher body that defines an inner flow path and at least one particle catcher passage through which the fluid flow path passes. An outer surface of the particle catcher and an inner surface of the control element form a particle catching portion. The at least one particle catcher passage directs the fluid flow path downwardly into the particle catching portion.

In some forms, the particle catcher passage is angled relative to the fluid flow path. This angled relationship causes the fluid flow path to change direction by approximately 120°.

In some examples, the fluid flow control device may further include a balancing port that is formed between the particle catching portion and an upper surface of the plug. The balancing port equalizes fluid pressure acting on opposite sides of the control element. The fluid flow control device may also include a retainer sweeper that is disposed on the upper surface of the control element. The retainer sweeper may assist in directing particles towards the balancing port so that they may be received in the particle catcher portion. The retainer sweeper may have a downward slope of approximately 30°. Other examples are possible.

In some aspects, the particle catcher may include a threaded portion that is threadably insertable into the control element. Further, the particle catcher can include an angled top diverter that is disposed adjacent to the at least one particle catcher passage. The particle catcher may also include an angled bottom diverter to divert fluid flow towards the cage. A straining member may extend into the particle catching portion to assist in retaining particles therein.

In accordance with another exemplary aspect, a particle catcher includes an elongated body having a first end, a second end, and an outer surface. The elongated body extends along a longitudinal axis and defining an inner flow path that extends between the first end and the second end along the longitudinal axis. The particle catcher further includes at least one particle catcher passage that extends between the inner flow path and the outer surface of the particle catcher. The at least one particle catcher passage extends downwardly and obliquely from the longitudinal axis.

BRIEF DESCRIPTION OF THE DRAWINGS

The above needs are at least partially met through provision of the fluid flow control device having a particle catcher described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
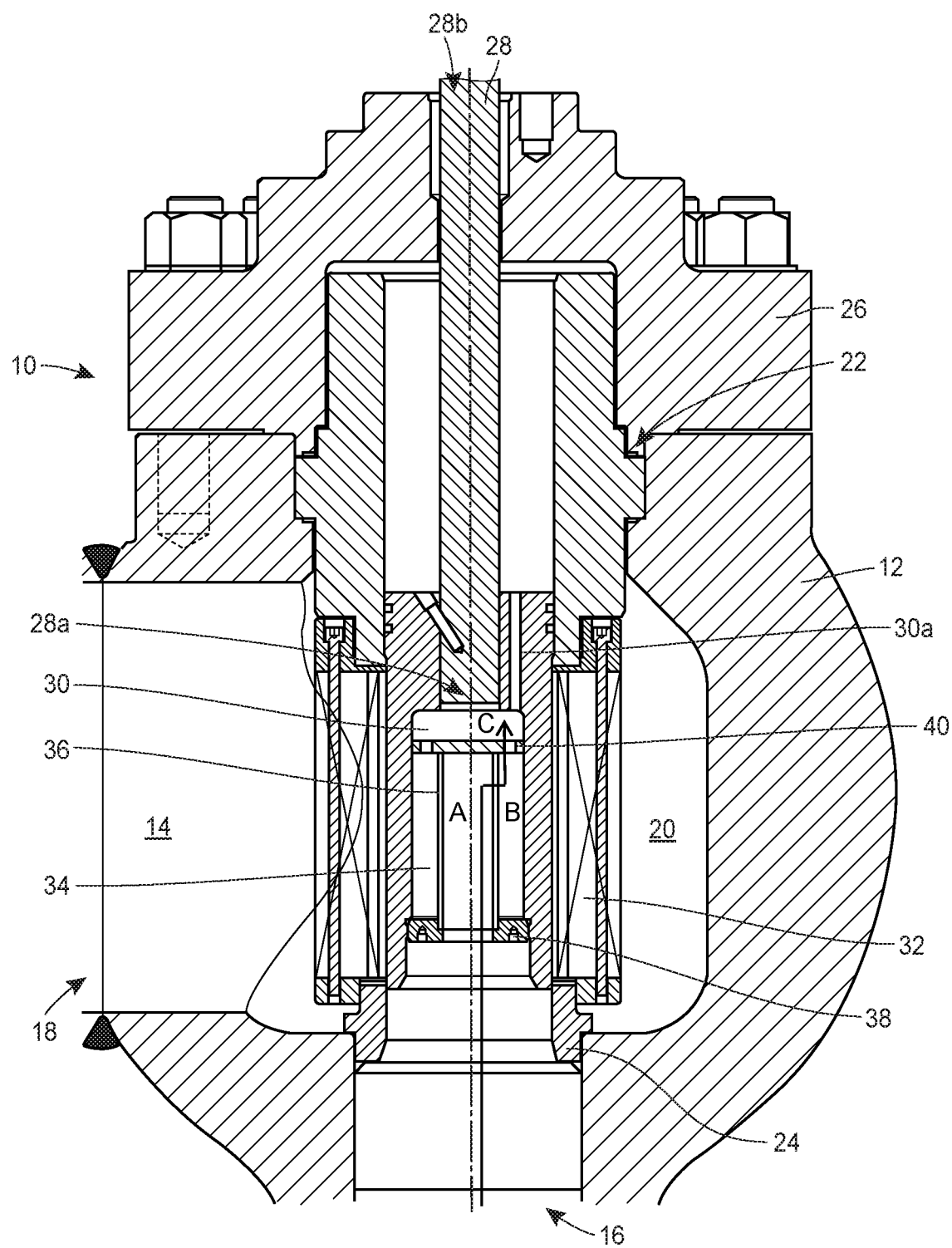
FIG. 1 illustrates a front partial cross-sectional view of a known valve.
Figure 2:
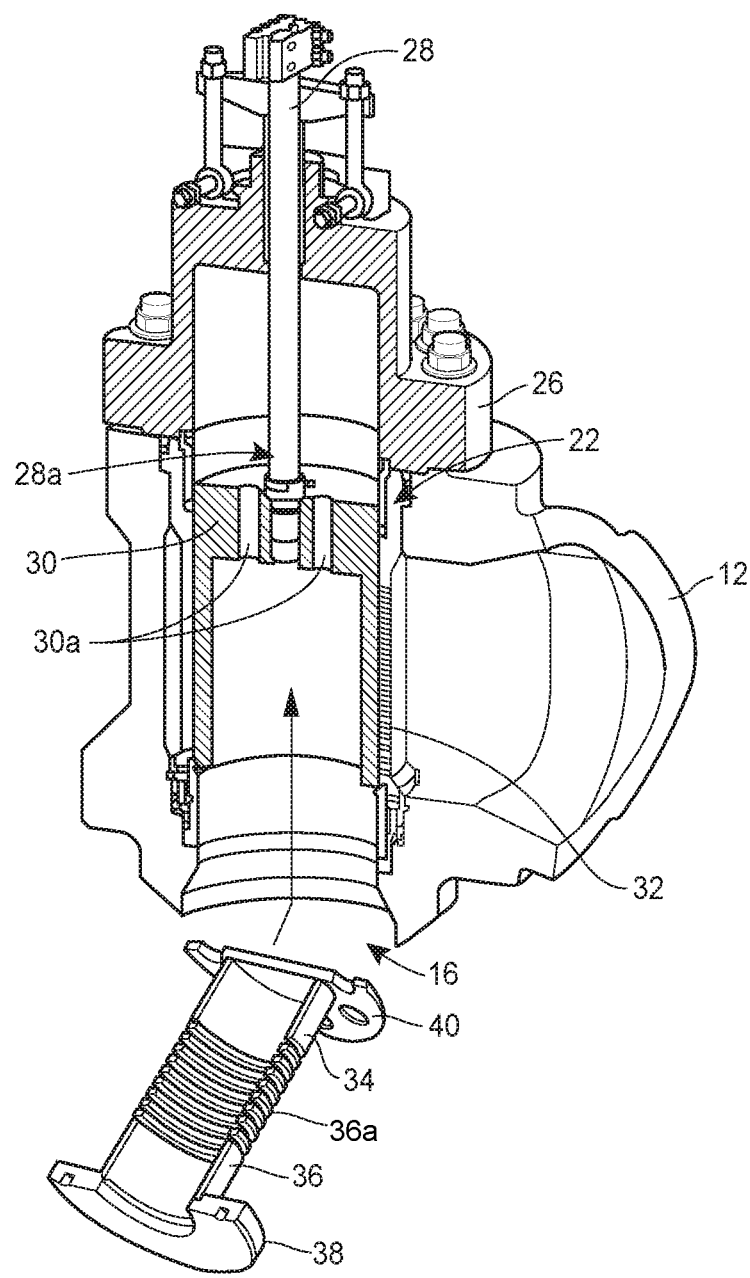
FIG. 2 illustrates a perspective partial cross-sectional view of the known valve of FIG. 1.
Figure 3:
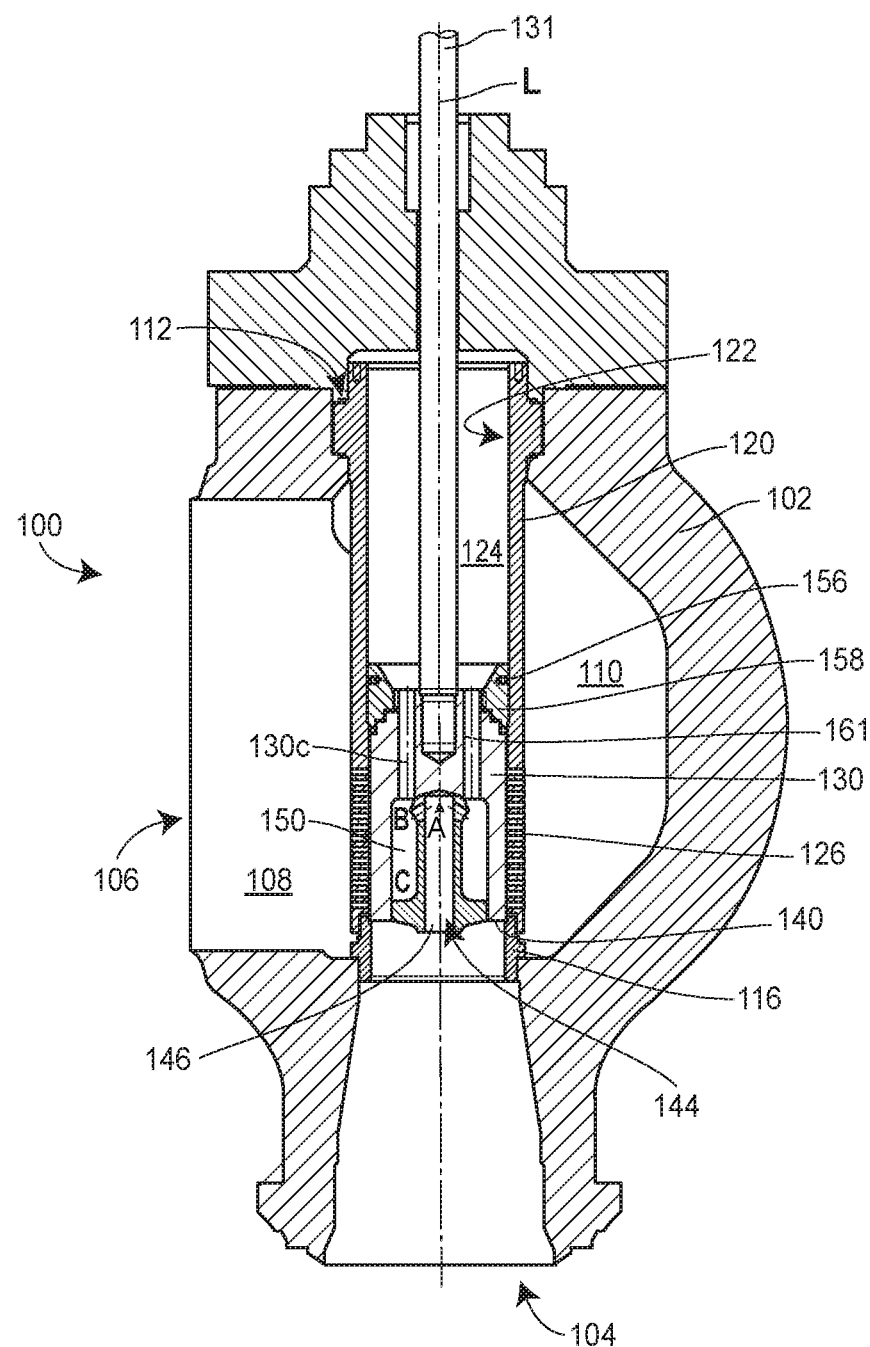
FIG. 3 illustrates a cross-sectional view of an exemplary valve having a particle catcher in accordance with various embodiments.
Figure 4:
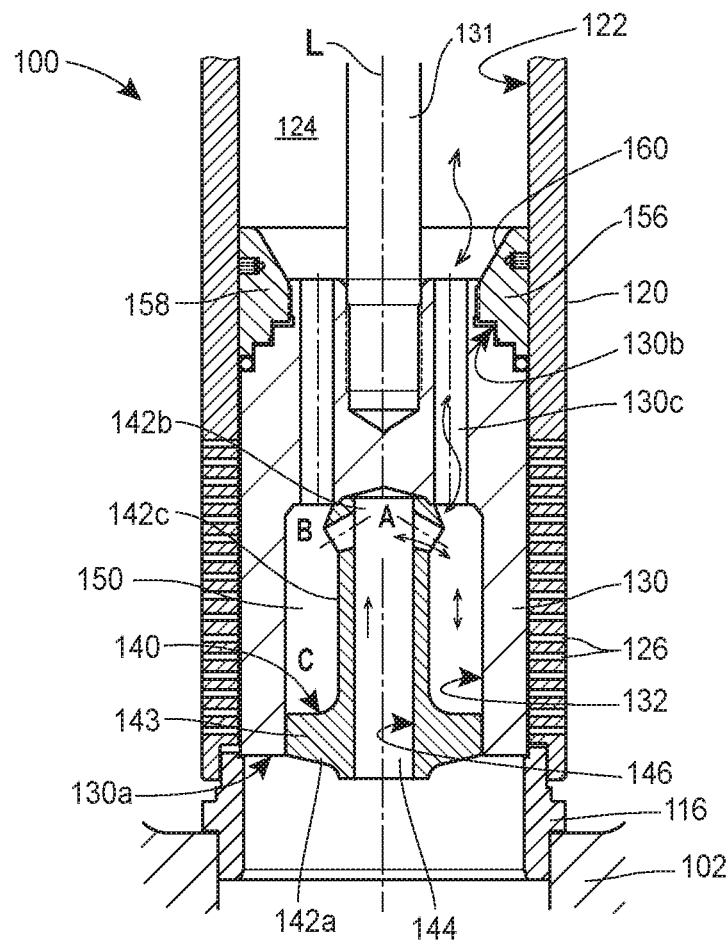
FIG. 4 illustrates a cross-sectional view of an example valve trim assembly of the valve of FIG. 3 in accordance with various embodiments.

An example valve having a particle catcher is shown in FIGS. 3 and 4. The example valve is a flow-up valve in which fluid, which includes magnetite, flows in a generally upwards direction. Generally speaking, the magnetite will enter the particle catcher with the fluid flow, whereupon the fluid flow path turns sharply and into a particle catching portion. The flow path again changes direction, traveling upwards, while the magnetite is retained in the catching portion.

The valve 100 can include a valve body 102, a valve seat ring 116 coupled to the valve body 102, a cage 120 coupled to the valve body 102, and a control element (e.g., a plug) 130 coupled to a valve stem 131. The plug 130 may couple to the valve stem 131 via any number of approaches such as, for example, a threaded connection. The valve body 102 defines an inlet 104, an outlet 106, a fluid flow path 108 extending from the inlet 104 to the outlet 106, and a gallery 110 disposed between the inlet 104 and the outlet 106. Further, the valve body 102 may define an opening 112 disposed in communication with the gallery 110. It is understood that the valve 100 may include any number of additional components such as sealing components (e.g., a piston ring or rings, a seal ring or rings, and/or a seat ring or rings) to assist in operation thereof.

The valve seat ring 116 is coupled to the valve body 102. The valve seat ring 116 defines an orifice through which the fluid flow path crosses. The cage 120 defines an interior bore 122 and defines a volume 124. The cage includes any number of cage passages 126 through which the fluid can pass. The plug 130 has a lower surface 130a and an upper surface 130b and includes any number of balance ports 130c extending between the lower surface 130a and the upper surface 130b allowing fluid to flow therebetween for equalizing fluid pressure acting on opposite sides of the plug 130. The plug 130 further defines an interior surface or bore 132. The plug 130 is slidably disposed within the interior bore 122 of the cage 120, which guides movement of the plug 130 along a longitudinal axis "L". The plug 130 cooperates with the valve seat ring 116 to control fluid flow through the valve body 102. In other words, the plug 130 is movable between a first, open position (not illustrated) whereby fluid can flow along the fluid flow path 108 from the inlet 104 to the outlet 106 and a second, closed position that restricts fluid flow.

Figure 5:
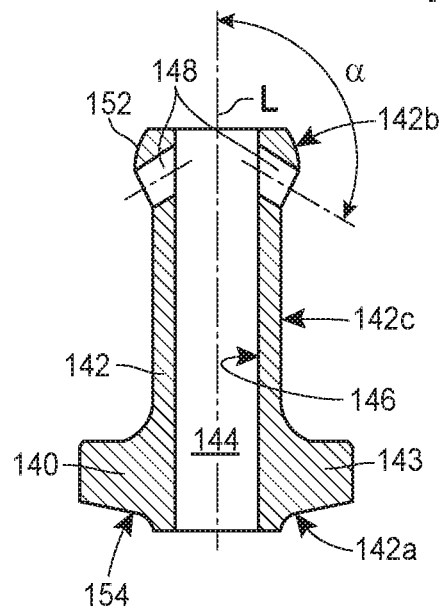
FIG. 5 illustrates a cross-sectional view of an example particle catcher for the valve of FIGS. 3 and 4 in accordance with various embodiments.

The valve 100 further includes a particle catcher 140 at least partially disposed within the interior bore 132 of the plug 130. In some examples, the particle catcher 140 may not be disposed within the interior bore 132 of the plug 130, and is rather positioned adjacent to the plug 130. The particle catcher 140 may be a one-piece construction that includes an elongated particle catcher body 142 having a first end 142a, a second end 142b, and an outer surface 142c and further defines an inner flow path 144 extending from the first end 142a of the particle catcher body 142 towards the second end 142b of the particle catcher body 142 along a longitudinal axis via a bore or channel 146. Further, the particle catcher 140 includes at least one particle catcher passage 148 formed through the particle catcher body 142 to connect the inner flow path 144 to the outer surface 142c. As illustrated in FIGS. 4 and 5, the particle catcher passage 148 is downwardly and obliquely angled relative to the inner flow path 144; that is, an angle between the longitudinal axis L (when installed in the valve body 102) and a longitudinal length of the particle catcher passage 148, denoted by "α" in FIG. 5, is greater than approximately 90°. Preferably, the angle α is equal to approximately 120°. Other examples of suitable angles greater than approximately 90° can be used. So configured, the particle catcher 140 is easily machined and constructed, requiring minimal manufacturing time and costs.

In some examples, the particle catcher body 142 may include a base portion 143 disposed at the first end 142a thereof. The base portion 143 may have a larger cross-sectional diameter than a cross-sectional diameter of the particle catcher body 142.

When the particle catcher 140 is disposed within (or adjacent to) the plug 130 (e.g., within the interior bore 132), the outer surface 142c of the particle catcher 140 cooperates with the interior bore 132 to form a particle catching portion 150 which catches, retains, and/or stores any magnetite particles in the fluid. The particle catching portion 150 is open to, and in fluid communication with, the balance port 130c of the plug 130.

Fluid flowing along the fluid flow path 108 from the inlet 104 to the outlet 106 enters the inner flow path 144 of the particle catcher 140 at the first end 140a thereof and advances to the second end 140b (as referenced by "A" in FIG. 3). The particle catcher passage 148 directs the fluid flow path downwardly such that the fluid flow changes direction and flows through the particle catcher passage 148 to the particle catching portion 150 (as referenced by "B" in FIG. 3). This change in direction urges any magnetite towards the bottom of the particle catching portion 150 (denoted by "C" in FIG. 3), while the remaining fluid again changes direction to flow upwards through the balance port 130c of the plug 130 to the volume 124 of the cage 120 to equalize forces on the plug 130. So configured, any magnetite in the fluid stream is retained in the particle catching portion 150 while fluid flows upwards.

Figure 6:
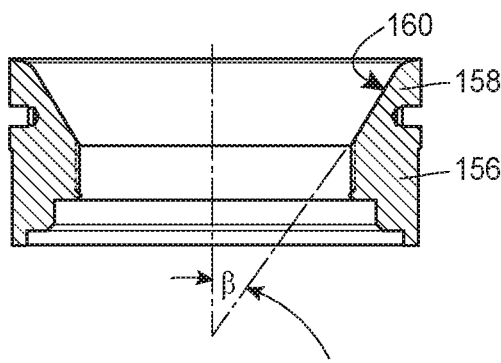
FIG. 6 illustrates a cross-sectional view of an optional sloped plug retainer in accordance with various embodiments.

In some examples, and as illustrated in FIGS. 3, 4, and 6, the valve 100 may include a retainer sweeper 156 (e.g., a funnel) disposed near, on, and/or within a portion of the upper surface 130b of the plug 130. The retainer sweeper 156 includes a body 158 having a downwardly angled surface 160. In some examples, the retainer sweeper forms an angle (denoted as "β" in FIG. 6) of approximately 30 degrees. Other examples of suitable angles are possible. The retainer sweeper 156 assists in guiding any magnetite particles that were not captured in the particle catching portion 150 down through the balance port 130c and back into the particle catching portion 150. So configured, magnetite disposed within the volume 124 between the cage 120 and the upper surface 130b of the plug may not collect in this area, thus avoiding potential jamming and restricted movement of the plug 130. It is understood that in some examples, the retainer sweeper 156 may be formed integrally with the plug 130, or may be include a sealing member 161 to create a seal between the retainer sweeper 156 and the plug 130.

As illustrated in FIG. 5, the particle catcher 140 may further include a top diverter portion 152 and/or a bottom diverter portion 154. The top diverter portion 152 may be in the form of a rounded protrusion located above the particle catcher passage 148. The top diverter portion 152 may act as a rebound to further divert the fluid flow and disturb the particles, causing them to settle in the particle catching portion 150. The bottom diverter portion 154 is formed by a curved portion to assist in improving flow efficiency relative to the cage 120. Further, the bottom diverter portion 154 reduces lifting force when the fluid flows upwards.

Figure 7:
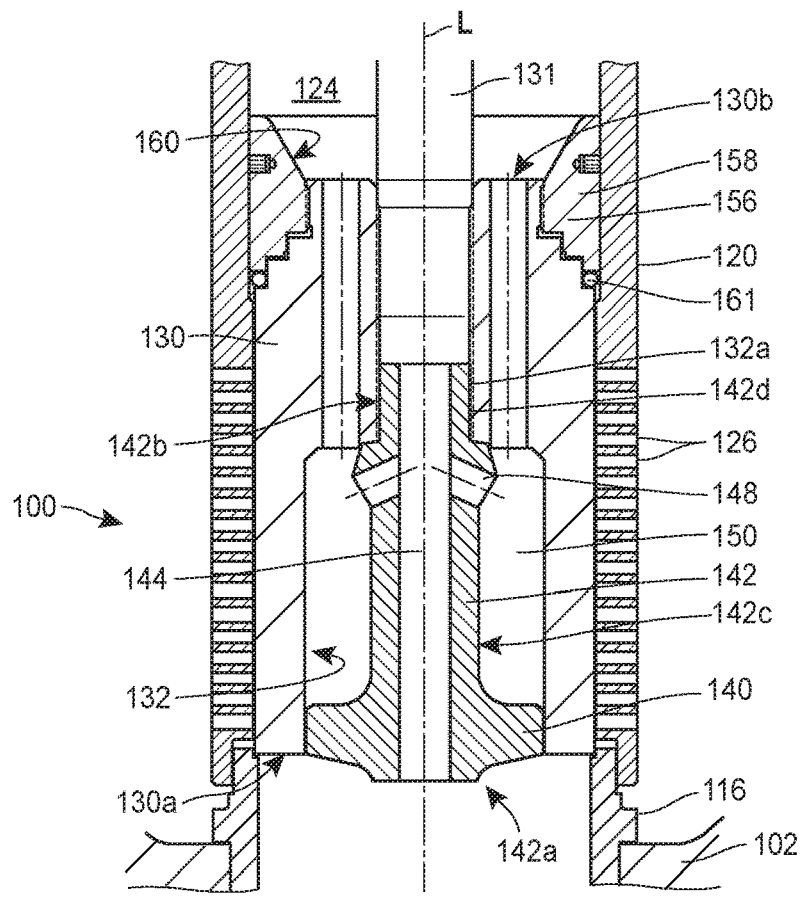
FIG. 7 illustrates an alternate particle catcher having an upper threaded portion in accordance with various embodiments.

As illustrated in FIG. 7, in some examples, the particle catcher 140 may further include a threaded portion 142d at the second end 142b of the particle catcher body 142. The threaded portion 142d may engage a corresponding threaded portion 132a of the interior bore 132 of the plug 130. This threaded portion 132a may coincide with the coupling mechanism that couples the plug 130 to the valve stem 131. The particle catcher 140 may couple to the plug 130 at any point along the bore 132.

Figures 8, 9:
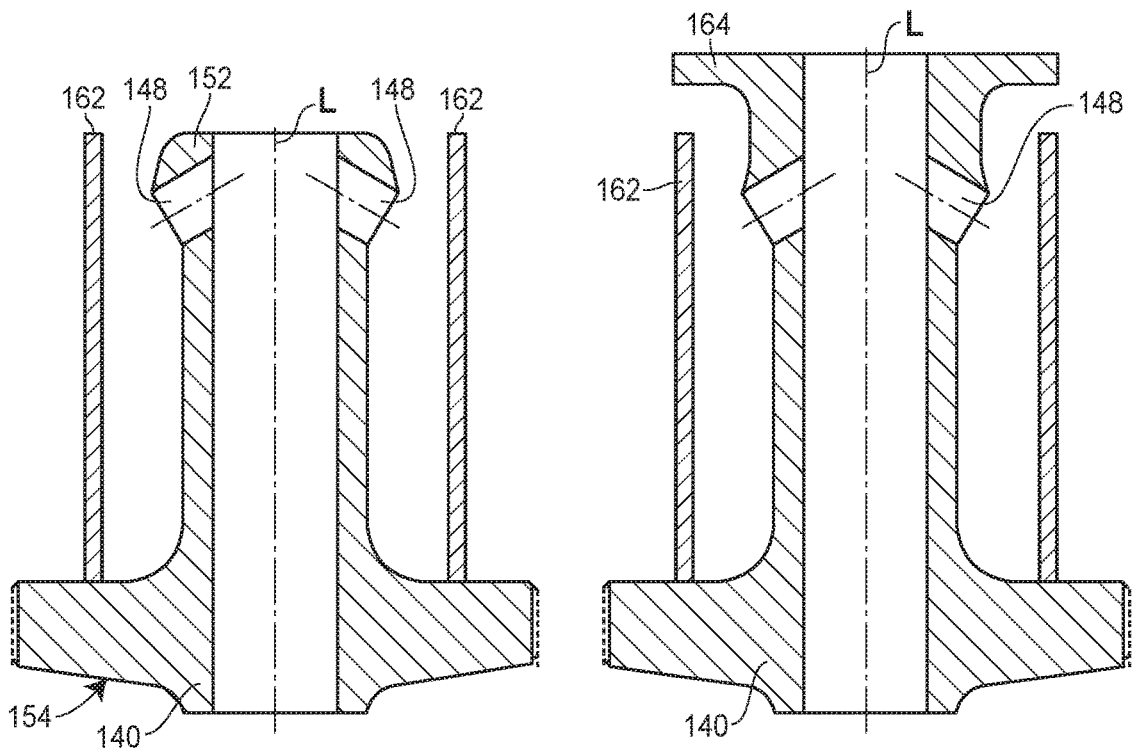
FIGS. 8 and 9 illustrate alternate particle catchers having at least one straining member in accordance with various embodiments.

As illustrated in FIGS. 8 and 9, in some examples, the particle catcher 140 may further include any number of straining members 162 coupled to the base portion 143 of the particle catcher body 142. The straining members 162 may project upwardly into the particle catching portion to provide additional straining stages to divert the fluid flow, causing the magnetite to be captured within the particle catching portion. The straining members may alternatively be formed integrally with the particle catcher 140. As depicted in FIG. 9, an additional, upper straining portion 164 in the form of a protrusion may also be used to further to divert the fluid flow, causing the magnetite to be captured within the particle catching portion.

Figure 10:
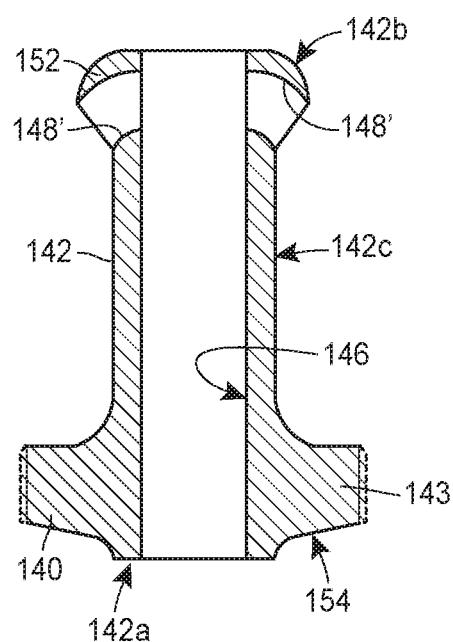
FIG. 10 illustrates an alternate particle catcher having a curved top diverter in accordance with various embodiments.
Figure 11:
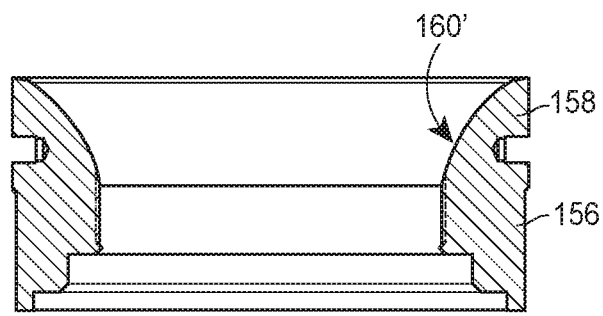
FIG. 11 illustrates an alternate plug retainer having a curved angled surface in accordance with various embodiments.

Turning to FIGS. 10 and 11, the example particle catcher 140 and retainer sweeper 156 can include any number of the features previously described with reference to FIGS. 3-9. Accordingly, these features will have similar reference numerals as those previously described with reference to FIGS. 3-9 and will not be described in detail. In the illustrated example of FIG. 10, the particle catcher 140 may include a particle catcher passage 148' having a different geometry. Specifically, in the example illustrated in FIG. 10, the particle catcher passage 148' includes a generally downwardly-angled passage that has a curved and/or arced length (as opposed to the generally straight length of the particle catcher 140 previously described). In some examples, the particle catcher passage 148' may include any combination of curved and/or straight portions as desired. Similarly, in some examples, and as illustrated in FIG. 11, the retainer sweeper 156 may include a curved and/or arced downwardly angled surface 160'. In some examples, the downwardly angled surface 160' may include any combination of curved and/or straight portions as desired.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A fluid flow control device comprising:
    a valve body defining an inlet, an outlet, and a fluid flow path extending from the inlet to the outlet;
    a valve seat ring coupled to the valve body and defining an orifice through which the fluid flow path passes;
    a cage coupled to the valve body and defining an interior bore, the cage including at least one cage passage through which the fluid flow path passes;
    a control element slidably disposed within the interior bore of the cage, the control element defining an interior bore, the control element and the valve seat ring cooperating to control fluid flow through the valve body, wherein in a first, open position, the control element is spaced from the valve seat ring to permit fluid flow and in a second, closed position, the control element abuts the valve seat ring to restrict fluid flow; and
    a particle catcher at least partially disposed within the interior bore of the control element, the particle catcher having a particle catcher body defining an inner flow path and further defining at least one particle catcher passage through which the fluid flow path passes;

wherein an outer surface of the particle catcher and an inner surface of the control element form a particle catching portion, and wherein the at least one particle catcher passage directs the fluid flow path downwardly into the particle catching portion such that particles contained in a fluid flowing through the fluid flow path are retained in the particle catching portion.

2. The fluid flow control device of claim 1, wherein the at least one particle catcher passage is angled relative to the fluid flow path such that a flow direction changes by approximately 120°.

3. The fluid flow control device of claim 1, further comprising a balancing port formed between the particle catching portion and an upper surface of the control element to equalize fluid pressure acting on opposite sides of the control element.

4. The fluid flow control device of claim 3, further comprising a retainer sweeper disposed near the upper surface of the control element, the retainer sweeper having a downward slope of approximately 30°.

5. The fluid flow control device of claim 1, wherein the particle catcher comprises a one-piece construction.

6. The fluid flow control device of claim 1, wherein the particle catcher further includes a threaded portion to be threadably inserted into the control element.

7. The fluid flow control device of claim 1, wherein the particle catcher further includes an angled top diverter disposed adjacent to the at least one particle catcher passage.

8. The fluid flow control device of claim 1, wherein the particle catcher further includes an angled bottom diverter to divert fluid flow towards the cage.

9. The fluid flow control device of claim 1, wherein the particle catcher further includes at least one straining member extending into the particle catching portion.

* * * * *

UNITED STATES PATENT AND TRADEMARK OFFICE
CERTIFICATE OF CORRECTION

PATENT NO. : 11,376,532 B2
APPLICATION NO. : 16/136806
DATED : July 5, 2022
INVENTOR(S) : Yan Qiu It is certified that error appears in the above-identified patent and that said Letters Patent is hereby corrected as shown below:

In the Specification

At Column 2, Line 6, "a" should be -- of a --.

At Column 2, Line 66, "defining" should be -- defines --.

At Column 5, Line 46, "may be include a sealing member 161" should be -- a sealing member 161 may be included --.

At Column 6, Line 11, "further to" should be -- further --.

In the Claims

At Column 7, Line 14, "120° ." should be -- 120°. --.

At Column 8, Line 4, "30° ." should be -- 30°. --.

Signed and Sealed this
Fifth Day of September, 2023

Katherine Kelly Vidal
*Director of the United States Patent and Trademark Office*